United States Patent Office 3,661,886
Patented May 9, 1972

3,661,886
BASIC AZO DYESTUFFS CONTAINING A HETEROCYCLIC QUATERNARY AMMONIUM GROUP
Gert Heger, Schoenenbuch, Switzerland, assignor to Ciba Limited, Basel, Switzerland
No Drawing. Continuation-in-part of application Ser. No. 657,796, Aug. 2, 1967. This application May 26, 1970, Ser. No. 40,734
Claims priority, application Switzerland, Aug. 5, 1966, 11,331/66; June 21, 1967, 8,815/67
Int. Cl. C09b 29/08, 29/12, 29/36
U.S. Cl. 260—156                                9 Claims

ABSTRACT OF THE DISCLOSURE

Basic dyestuffs which are free from acidic groups imparting solubility in water and which correspond to the formula

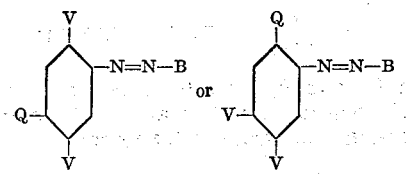

wherein Q is an electronegative group, B is a coupling component, one of V is hydrogen, alkyl, chlorine or bromine and the other a —O— alkyleneamino moiety. The compounds are prepared by coupling, condensation with an amine or hydrazine or by alkylation. They are useful for dyeing synthetic fibers, yielding strong and level dyeings of good general fastness, especially fastness to wet treatments, light and rubbing.

This application is a continuation-in-part of application Ser. No. 657,796, filed Aug. 2, 1967 (now abandoned).

The present invention is based on the observation that valuable basic azo dyestuffs which are free from acidic groups imparting solubility in water, particularly sulfonic and carboxylic acid groups, and which correspond to the formula (1)      $R_1$
          $\diagdown$
    $R_2{-}N{-}alk{-}Y{-}A{-}N{=}N{-}B$
         $\diagup +$
      $[R_3 \; X^-]_{n-1}$ in which A represents a benzene residue containing at least one negative substituent, preferably in para-position to the azo bridging group, Y represents an oxygen or a sulphur atom bound to the residue A preferably in ortho-position to the azo bridging group, B represents the residue of a coupling component, alk represents a low-molecular alkylene group which may be branched, preferably a hydroxypropylene group which may be acylated or especially an ethylene group, $R_1$ represents an amino or a cycloamino group, especially an —$NH_2$ group, or an alkyl, aralkyl or cycolalkyl group and $R_2$ and $R_3$ each represents an alkyl aralkyl or cycloalkyl group, or $R_1$ and $R_2$ and/or $R_3$, together with the nitrogen atom, may form a heterocyclic ring, X represents an anion an $n$ stands for 1 or 2, may be obtained when (a) a diazo compound prepared from an amine of the formula (2)       $R_1$
           $\diagdown$
    $R_2{-}N{-}alk{-}Y{-}A{-}NH_2$
         $\diagup +$
      $[R_3 \; X^-]_{n-1}$ in which A, $A_1$, $R_2$, $R_3$, X, Y, $n$ and alk have the meanings given above, is coupled with a coupling component, or (b) an azo dyestuff of the formula (3)         Z-alk-Y—A—N=N—B in which Z represents an eliminable atom or an eliminable group, especially a halogen atom or an ester grouping, and alk, Y, A and B have the meanings given above, is reacted with a secondary or tertiary amine or a hydrazine of the formula

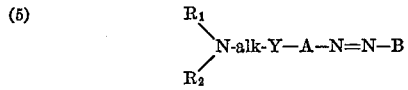

in which $R_1$, $R_2$ and $R_3$ have the meanings given above, or, when $n$ stands for 2, (c) an azo dyestuff of the formula (5)       $R_1$
           $\diagdown$
           $N$-alk-Y—A—N=N—B
           $\diagup$
          $R_2$ in which $R_1$, $R_2$, alk, Y, A and B have the meanings given above, is treated with an alkylating agent of the formula $R_3X$, in which $R_3$ and X have the meanings given above.

In process (a) of the present invention, the new azo dyestuffs may be advantageously manufactured by coupling a diazo compound of an amine of the Formula 2 with any desired coupling component. The compounds of the Formual 2 may be obtained, for example, by condensing a sulphatoalkyl ether or a chloroalkyl ether of an acylaminophenol, which contains a negative substituent in the phenyl nucleus (for example, of 4-nitro-2,β-chloroethoxy-1-acetylaminobenzene), with a secondary or tertiary amine or with a hydrazine which contains a secondary or tertiary nitrogen atom, and splitting off the acyl group. These compounds are new, and the process for their manufacture is also included in the invention. By electronegative substituent or substituent of the second order is meant those sub-substituents which direct a new substituent introduced into the benzene nucleus in meta-position by electrophilic substitution. The bond joining such substituents to the aromatic nucleus has a dipole moment which is greater than one Debye unit, the positive end of the dipole being attached to the aromatic ring.

Examples of amines of the kind mentioned are particularly those of the formula

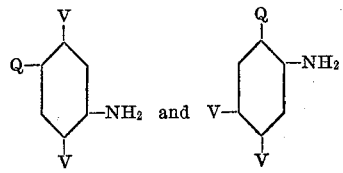

in which Q represents a negative substituent as defined above, for example, an aryl-$SO_2$ or alkanesulphonyl group, a group of the formula $$-SO_2{-}N{-}C_{n-1}H_{2n-1}$$
$$\;\;\;\;\;\;\;\;\;\;\;|$$
$$\;\;\;\;\;\;\;\;\;\;\;R_6$$

(in which $n$ is an integer not greater than 7 and $R_6$ represents an alkyl or an aryl group or a hydrogen atom), a nitrile group or preferably a nitro group and one of the symbols V represents a tertiary or quaternary hydroxy- or thioalkylamino or -hydrazino group, for example, a group of the formula

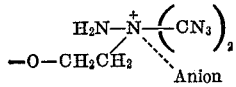

and the other symbol V represents an alkyl group or a chlorine, bromine or hydrogen atom.

Suitable diazo components of the kind defined are, for example, the ethylethers of 5-nitro-2-aminothiophenol, 4-nitro-2-aminophenol, 4,6-dinitro - 2 - aminophenol, 5-methanesulphonyl- or 5-nitro-2-aminophenol, 5-nitro-4-chloro-2-aminophenol, 4-nitro-3-aminophenol, 6-nitro-4-chloro-3-aminophenol, 4-chloro - 2 - aminophenol-5-sulphonic acid amide or -N-methyl amide or 3-nitro-4-aminophenol which contain in the β-position of the ethylether residue a tertiary or quaternary hydrazino or amino group, for example, a group derived from one of the amines or hydrazines mentioned in process (b), especially a group of the formula

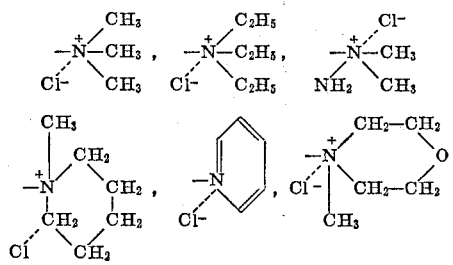

and also the corresponding β-hydroxy- or β-acyloxy-propyl ethers which contain the hydrazino or amino group in γ-position of the propylene chain.

Subsequent to diazotization, the amines of Formula 2 may be coupled in accordance with process (a) with coupling components which are free from acidic groups imparting solubility in water, for example, with coupling components of the benzene, naphthalene or heterocyclic series. The coupling components of the benzene series which may be mentioned in addition to the phenols, for example, para-cresol, are, in particular, the aminobenzenes, for example, aniline,
3-methylaniline,
2-methoxy-5-methylaniline,
3-acetylamino-1-aminobenzene,
N-methylaniline,
N,β-hydroxyethylaniline,
N,β-methoxyethylaniline,
N,β-cyanoethylaniline,
N,β-chloroethylaniline,
dimethylaniline,
diethylaniline,
N-methyl-N-benzylaniline,
N,n-butyl-N,β-chloroethylaniline,
N-methyl-N,β-cyanoethylaniline,
N-methyl-N,β-hydroxyethylaniline,
N-ethyl-N,β-chloroethylaniline,
N-methyl-N,β-acetoxyethylaniline,
N-ethyl-N,β-methoxyethylaniline,
N,β-cyanoethyl-N,β-chloroethylaniline,
N-cyanoethyl-N-acetoxyethylaniline,
N,N-di-(β-hydroxyethyl)-aniline,
N,N-di-(β-acetoxyethyl)-aniline,
N-ethyl-N,β-hydroxy-γ-chloropropylaniline,
N,N-di-(β-cyanoethyl)-aniline,
N,N-di-(β-cyanoethyl)-3-methylaniline,
N,β'-cyanoethyl-N,β''-hydroxyethyl-3-chloroaniline,
N,N-di-(β-cyanoethyl)-3-methoxyaniline,
N,β'-cyanoethyl-N,β''-hydroxyethyl-3-ureidoaniline,
N,N-dimethyl-3-acetylaminoaniline,
N-ethyl-N,β-cyanoethyl-3-acetylaminoaniline,
N,N-di-β-cyanoethyl-2-methoxy-5-acetylamino-aniline,
N,N-di-(β-cyanoethoxyethyl)-aniline,
N-methyl-N-phenacetylaniline,
N,β-cyanoethyl-2-chloroaniline,
N,N-diethyl-3-trifluoromethylaniline,
N-ethyl-N-phenylaniline,
diphenylamine,
N-methyldiphenylamine,
N-methyl-4-ethoxydiphenylamine or
N-phenylmorpholine, and also, for example, amines of the formula

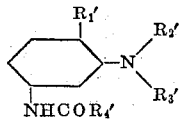

in which $R_1'$ represents a hydrogen atom or an alkyl or alkoxy group, $R_2'$ represents a cyanoalkoxyalkyl group, $R_3'$ represents a hydrogen atom, a cyanoalkoxyalkyl group or an acyloxyalkyl group and $R_4'$ represents a hydrogen atom, an alkyl, cycloalkyl or alkoxy group that may be substituted or a benzene residue, and especially those of the formula

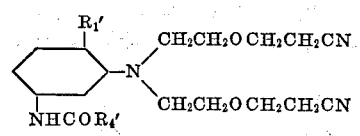

in which $R_1'$ and $R_4'$ have the meanings given above.

Specially valuable results may also be obtained by using coupling components of the formula

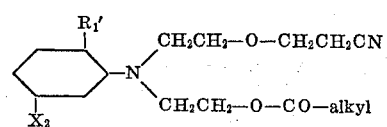

and

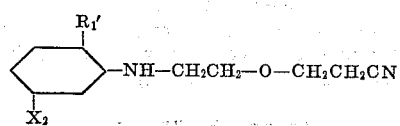

in which $R_1'$ has the meaning given above and $X_2$ represents an acylamino group, and in which alkyl represents, for example, a methyl, ethyl or propyl group.

The following coupling components are given as examples:

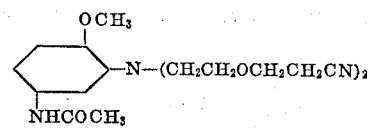

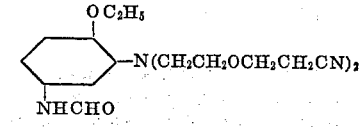

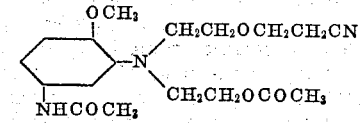

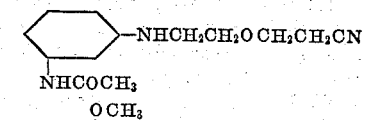

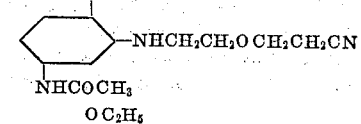

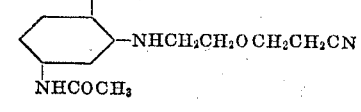

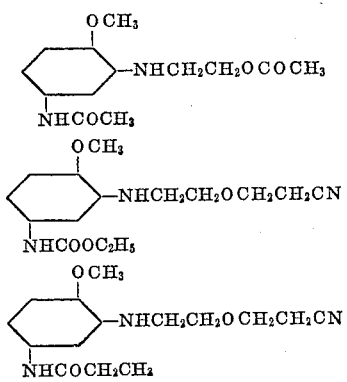

The coupling components of the naphthalene series which may be mentioned in addition to the naphthols are, for example, 1- or 2-naphthylamine, 2-phenylaminonaphthalene, 1-dimethylaminonaphthalene and 2-ethylaminonaphthalene, and also 2-aminonaphthalene-3-carboxylic acid amide, 2-aminonaphthalene-3-carboxylic acid anilide, 2-aminonaphthalene-3-carboxylic acid-N-methylanilide, 2-aminonaphthalene-3-carboxylic acid benzylamide, 2-aminonaphthalene - 3 - carboxylic acid methylester, 2-aminonaphthalene-3-carboxylic acid butylester, 2-aminonaphthalene-3-carboxylic acid-β-hydroxyethylester and 2-aminonaphthalene-3-carboxylic acid phenylester. Heterocyclic coupling components are, for example, the indoles, for example, 2-methylindole, 2,5-dimethylindole, 2,4-dimethyl-7-methoxyindole, 2-phenyl- or 2-methyl-5-ethoxyindole, 2 - methyl-5- or -6 - chloroindole, 1,2 - dimethylindole, 1-methyl-2-phenylindole, 2-methyl-5-nitroindole, 2-methyl-5-cyanoindole, 2 - methyl-7-chloroindole, 2-methyl-5-fluoro- or -5-bromoindole, 2-methyl-5,7-dichloroindole or 2-phenylindole and 1-cyanoethyl-2,6-dimethylindole, and also pyrazoles, for example, 1-phenyl-5-aminopyrazole, 3-methylpyrazolone-5, 1-phenyl-3-methylpyrazolone-5, 1,3-dimethylpyrazolone-5, 1 - butyl-3-methylpyrazolone-5, 1-hydroxyethyl-3-methylpyrazolone-5, 1-cyanoethyl-3-methylpyrazolone-5, 1-(orthochlorophenyl) - 3 - methylpyrazolone-5, 3-carbomethoxypyrazolone-5, quinolines, for example, 1 - methyl-4-hydroxyquinolone-2 or N-ethyl-3-hydroxy-7-methyl - 1,2,3,4 - tetrahydroquinoline, or pyrimidines, for example, barbituric acid, and also 1,3-indanedione, 1,8-naphthoindanedione or dimedone.

A mixture of two or more of the diazo components and a mixture of two or more of the coupling components may also be used in accordance with the invention.

Diazotization of the above-mentioned diazo components may be carried out by known methods, for example, with a mineral acid, especially hydrochloric acid, and sodium nitrite, or, for example, with a solution of nitrosylsulphuric acid in concentrated sulphuric acid.

Coupling may also be carried out in known manner, for example, in a neutral to acid medium, if necessary, in the presence of sodium acetate or a similar buffer which influences the rate of coupling, or a catalyst, for example, pyridine or a salt thereof.

The new dyestuffs may also be manufactured according to process (b) of the present invention by amidation or hydrazidation, in that dyestuffs of the Formula 3, in which Z contains a reactive group or a reactive atom, for example, a β-sulphato- or β-chloroethylamino group or a halogen atom, are reacted with a secondary or tertiary amine or with hydrazine. The azo dyestuffs used as starting materials in this embodiment of the invention may be obtained from the corresponding components by coupling in accordance with the process described above. Reaction with the secondary or tertiary amines or hydrazines is advantageously effected by heating in an excess of the amine in the presence or absence of a solvent. Suitable secondary tertiary amines or hydrazines are, for example, dimethylamine, diethylamine, diethanolamine, trimethylamine, triethylamine, triethanolamine, pyridine, picoline, lutidine, collidine, piperidine, dimethylcyclohexylamine, anisyl-, butyl-, ethyl-, ethylmethyl-, phenyl-, diphenyl-, triphenyl-, acetamido-, acetyl-, bromo-, bromomethyl-, bromomethoxy-, chloro-, chloromethyl-, chlorodimethyl-, cyano-, diacetamino-, dibromo-, diethoxy-, ethoxy-, ethoxymethyl-, acetamidonitro-, acetoxymethyl-, amino-, aminomethyl-, aminodimethyl-, amyloxy-, benzyloxy-, benzyloxymethyl-, diamino-, diethylamino-, dimethylmethoxy-, dimethylnitro-, methylnitro- or hydroxy-pyridine, nicotinic acid amide, nicotinic acid ethylester, picolinic acid, amide, quinoline, isoquinoline and derivatives of qunoline containing as substituents halogen atoms or alkyl, alkoxy, aryl, aralkyl, aryloxy, acylamido, acyloxy, nitro, amino, cyano or hydroxyl groups, and of isoquinoline, piperazine, morpholine, thiomorpholine, pyrimidine or pyrrolidine; N-methylhydrazine, N,N'-dimethylhydrazine, N,N-dimethylhydrazine, N,N,N' - triethylhydrazine, N-aminopiperidine and compounds of the formula

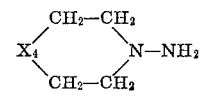

in which $X_4$ represents —NH—, —N(CH$_3$)—, —O— or —S—.

Reaction with a secondary amine or hydrazine produces the corresponding tertiary amino or hydrazino compounds, and reaction with a tertiary amine or hydrazine produces the corresponding quaternary amnio or hydrazino compounds.

The new dyestuffs that contain a quaternated amino or hydrazino group ($n=2$) may be obtained according to a third embodiment of the invention, process(c), in which the corresponding dyestuffs, which contain a tertiary amino or hydrazino group, are quaternated by treatment with alkylating agents. Suitable alkylating or quaternating agents are, for example, esters of strong mineral acids or organic sulphonic acids, for example, dimethyl sulphate, diethyl sulphate, alkyl halides, for example, methyl chloride, methyl bromide or methyl iodide, aralkyl halides, for example, benzyl chloride, esters of low-molecular-weight alkane sulphonic acids, for example, methylesters of methane sulphonic acid, ethane sulphonic acid or butane sulphonic acid, and esters of benzene sulphonic acids, which may contain additional substituents, for example, methyl, ethyl, propyl or butyl esters of benzene sulphonic acid, of 2- or 4-methylbenzene sulphonic acid, 4-chlorobenzene sulphonic acid or 3- or 4-nitrobenzene sulphonic acid.

It is expedient to effect alkylation by heating in an inert organic solvent, for example, a hydrocarbon, for example, benzene, toluene or xylene, a halogenated hydrocarbon, for example, carbon tetrachloride, tetrachloroethane, chlorobenzene or othro-dichlorobenzene, or a nitrohydrocarbon, for example, nitromethane, nitrobenzene or a nitronaphthalene. It is also possible to use anhydrides, acid amides or nitriles as solvents in the alkylation process, for example, acetic anhydride, dimethylformamide or acetonitrile; dimethylsulphoxide may also be used as solvent. Use may also be made of a large excess of alkylating agent instead of a solvent. In this case, care must be taken to ensure that the mixture does not become unduly heated, because the reaction is highly exothermic. However, in most cases it is generally necessary to apply external heat to the reaction mixture to initiate the reaction, particularly when working in the presence of an organic solvent. In special cases, alkylation may also be carried out in an aqueous medium or with the use of an alcohol, if necessary, in the presence of a small amount of potassium iodide.

The dyestuff salts may be purified, if necessary, by dissolving them in water, and any unreacted starting dyestuff can be filtered off as an insoluble residue. The dyestuff may be precipitated from the aqueous solution by the addition of a water-soluble salt, for example, sodium chloride.

The quaternated dyestuffs obtained by the processes of the invention preferably contain as anion the residue of a strong acid, for example, sulphuric acid, or a semi-ester thereof or the residue of an alkyl- or arylsulphonic acid or a halogen ion. The said anions, which are introduced into the dyestuff molecule in accordance with the invention, may also be replaced by anions of other inorganic acids, for example, phosphoric or sulphuric acid, or by anions of organic acids, for example, formic, acetic, chloracetic, oxalic, lactic or tartaric acid; in some cases it is also possible to use the free bases. The dyestuff salts may also be used in the form of double salts, for example, with halides of elements of Group II of the Periodic Table, especially zinc chloride or cadmium chloride.

The dyestuffs or dyestuff salts containing a quaternated amino group obtained by the processes of the present invention are suitable for dyeing and printing a very wide variety of synthetic fibers, for example, polyvinyl chloride, polyamide and polyurethane fibres, and also fibres made from polyesters of aromatic dicarboxylic acids, for example, polyethylene terephthalate fibres, but especially polyacrylonitrile fibres or polyvinylidene cyanide fibres (Darvan). By polyacrylonitrile fibres is meant principally polymers containing more than 80 percent of acrylonitrile, for example, 80 to 95 percent; they may also contain 5 to 20 percent of vinyl acetate vinyl pyridine, vinyl chloride, vinylidene chloride, acrylic acid, acrylic acid esters, methacrylic acid, methacrylic acid esters, and so forth. These products are sold under the following trade names "Acrilan 1656" (Chemstrand Corporation, Decatur, Ala., U.S.A.), "Acrilan 41" (Chemstrand Corporation), "Creslan" (American Cyanamid Company), "Orlon 44" (Du Pont), "Crylor HH" (Soc. Rhodiacéta SA, France), "Leacril N" (Applicazioni Chimice Società per Azioni, Italy), "Dynel" (Union Carbide Chem. Corp.), "Exlan" (Japanese Exlan Industry Co., Japan), "Vonnel" (Mitsubishi, Japan), "Verel" (Tennessee Eastman, U.S.A.), "Zefran" (Dow Chemicals, U.S.A.), "Wolcrylon" (Filmfabrik Agfa, Wolfen), "Ssaniw" (U.S.S.R.), and also "Orlon 42," "Dralon," "Courtelle," and so forth.

The new dyestuff produced on these fibres, which may also be dyed in admixture with one another, intense and level dyeings possessing good fastness to light and good properties of general fastness, especially good fastness to washing, perspiration, sublimation, crease-resist finishing, decatizing, hot-pressing, rubbing, carbonizing, water, sea water, dry cleaning, cross-dyeing and solvents. The new dyestuffs of the invention also display, interalia, good stability in a wide pH range, good affinity in aqueous solutions of different pH values, and good fastness to kier-boiling. Furthermore, the new dyestuffs reserve well on wool and other natural or synthetic polyamide fibres.

The quaternated, water-soluble dyestuffs generally show little sensitivity to electrolytes, and some of them display exceptionally good solubility in water or organic solvents. Dyeing with the quaternated, water-soluble dyestuffs is generally carried out in an aqueous neutral or acid medium at the boil under atmospheric pressure or in a closed vessel at an elevated temperature and under superatmospheric pressure. The ordinary commercial levelling agents have no deleterious effect if used, but they are not necessary.

The said dyestuffs are also highly suitable for three-colour dyeing. Furthermore, by virtue of their stability to hydrolysis, they may be used with advantage in high-temperature dyeing and for dyeing in the presence of wool. They may also be applied to the fibrous materials by printing processes. In this method of application, a printing paste is used which contains, for example, the usual printing adjuvants in addition to the dyestuff. The dyestuffs are also suitable for the bulk colouration of acrylonitrile polymerization products and other synthetic materials, if necessary in solution, the colourations produced being fast to light and washing. They are also suitable for colouring oil paints and lacquers, and for dyeing cotton, especially mordanted cotton, cellulose, regenerated cellulose and paper.

The new dyestuffs manufactured by the processes of the invention which are insoluble in water and which contain a tertiary amino group are advantageously used in a finely divided form and in the presence of a dispersing agent, for example, soap, sulphite cellulose waste liquor or a synthetic detergent, or a combination of different wetting and dispersing agents. Prior to dyeing it is generally advantageous to convert the dyestuff into a dyeing preparation which contains a dispersing agent and the finely divided dyestuff in a form such that a fine dispersion is formed when the preparation is diluted with water. Such dyestuff preparations may be obtained in known manner, for example, by precipitating the dyestuff from sulphuric acid and grinding the suspension so obtained with sulphite cellulose waste liquor. If necessary, they may also be prepared by grinding the dyestuff in a highly efficient grinding device in the dry or wet state in the presence or absence of a dispersing agent. They are also suitable for dyeing and printing a very wide variety of synthetic fibres, for example, polyacrylonitrile, polyvinyl chloride, polyamide and polyurethane fibres, but especially fibres made from polyesters of aromatic dicarboxylic acids, for example, polyethylene terephthalate fibres.

To obtain stronger dyeings, for example, on polyethylene terephthalate fibres, it is advantageous to add a swelling agent to the dyebath, or to carry out the dyeing process under superatmospheric pressure at a temperature of above 100° C., for example, at 120° C. Suitable swelling agents are aromatic carboxylic acids, for example, benzoic acid or salicylic acid, phenols, for example, ortho- or para-hydroxydiphenyl, aromatic halogenated compounds, for example, chlorobenzene, ortho-dichlorobenzene, or trichlorobenzene, phenylmethylcarbinol or diphenyl. When carrying out the dyeing process under superatmospheric pressure it is generally advantageous to render the dyebath slightly acid, for example, by the addition of a weak acid, for example, acetic acid.

The new dyestuffs having a tertiary amino group are specially suitable for application by the so-called thermo-fixation process in which the fabric to be dyed is impregnated preferably at a temperature not exceeding 60° C. with an aqueous dispersion of the dyestuff which advantageously contains 1 to 50 percent of urea and a thickening agent, especially sodium alginate and squeezed in the usual manner. The fabric is advantageously squeezed so as to retain 50 to 100 percent of its dry weight of dye-liquor.

To fix the dyestuff, the fabric so impregnated is heated to a temperature above 100° C., for example, to a temperature between 180 and 220° C., preferably after drying, for example, in a current of warm air.

The above-mentioned thermofixation process is specially suitable for dyeing union fabrics made from polyester fibres and cellulosic fibres, especially cotton. In this case, the padding liquor contains, in addition to the dyestuff to be used in accordance with the invention, dyestuffs which are suitable for dyeing cotton, for example, direct dyestuffs or vat dyestuffs, or especially the so-called reactive dyestuffs, that is to say, dyestuffs that can be fixed on the cellulosic fibre with formation of a chemical bond, for example, dyestuffs which contain a chlorotriazine or a chlorodiazine residue. In the latter case, it is advantageous to add an agent capable of binding acid to the padding solution, for example, an alkali metal carbonate or an alkali metal phosphate or an alkali metal borate or perborate, or a mixture thereof. When using vat dyestuffs, the padded fabric has to be treated after the heat treatment with an aqueous alkaline solution of one of the reducing agents commonly used in vat dyeing.

The dyeings produced on polyester fibres by the said process are advantageously subjected to an after-treatment, for example, by heating with an aqueous solution of a non-ionic detergent.

The said dyestuffs are also suitable for dyeing union fabrics made from polyester fibre and wool; the wool portion of the fabric is reserved and can subsequently be dyed with a wool dyestuff.

The dyestuffs may also be applied by printing processes. In this method of application a printing paste, for example, is used which contains the finely divided dyestuff, if necessary, in admixture with one of the above-mentioned cotton dyestuffs, as well as the adjuvants normally used in printing, for example, wetting and thickening agents, if necessary, together with urea and/or an agent capable of binding acid.

The processes indicated produce strong dyeings and prints possessing excellent properties of fastness, especially good fastness to light, sublimation, decatizing, washing and chlorinated water. A further advantage of the dyestuffs to be used in accordance with the invention is that they reserve well on wool and cotton.

The following examples illustrate the invention. Unless otherwise stated, the parts and percentages are by weight.

EXAMPLE 1

240 parts of 2-acetylamino-5-nitrophenol-2'-hydroxyethylether are suspended in 320 parts of pyridine and then 200 parts of para-toluenesulphochloride are added to the mixture at about 20° C. The batch is stirred for one hour at room temperature, the reaction mixture is diluted with 4,000 parts of water, and the ester which precipitates is isolated by suction filtration.

364 parts of the ester and 240 parts of pyridine are stirred for 2 hours at 130 to 135° C., cooled, 1,200 parts of water and 400 parts of concentrated hydrochloric acid are added, and the batch is stirred for one hour at 100° C. to hydrolyse the acetyl group. The aqueous hydrochloric acid solution obtained, the content of which is determined by titration with nitrite solution, may be used as it is for diazotization; the reaction product, 2-(2'-amino - 5' - nitro)-phenoxyethylpyridinium chloride, may also be isolated in solid form from the aqueous solution by salting out with sodium chloride.

The para-toluenesulphonic ester described above may also be reacted with other tertiary amines, for example, triethylamine or N-methylpyrrolidine, or with dimethylhydrazine instead of with pyridine. A diazo component carrying a cationic group is obtained which yields dyestuffs similar to those obtained with the pyridinium salt described above.

EXAMPLE 2

92 parts of 2 - acetylaminophenol - 5 - sulphonic acid amide, 27 parts of water, 40 parts of 40% sodium hydroxide solution and 95 parts of para-toluenesulphonic acid-β-chloroethylester are stirred for 2 hours under reflux, the crystal slurry which forms is diluted with water, suction-filtered and dried. 30 parts of the phenolether so obtained, 21 parts of pyridine and 0.2 part of sodium iodide are stirred for 40 hours at 120 to 130° C., the semi-solid mass is dissolved in 400 parts of water, 50 parts of concentrated hydrochloric acid are added and the batch is kept at boiling temperature for 2 hours. The aqueous solution of 2 - (2' - amino - 5' - aminosulphonyl) - phenoxy - N-ethylpyridinium chloride so obtained may be used as it is for diazotization.

The 2 - acetylaminophenol - 5 - sulphonic acid amide may be replaced by 2 - acetylamino - 4 - chlorophenol-5-sulphonic acid dimethylamide, 2-acetylamino-5-nitrophenol or -thiophenol or 2 - acetylamino - 5 - methylsulphonylphenol, and the same procedure followed.

The phenol-β-chloroethylethers may also be reacted with equal success with morpholine, piperidine, N-aminopiperidine, 2-, 3- or 4-methylpyridine or mixtures thereof, N-methylpyrrolidine or triethylamine instead of with pyridine.

EXAMPLE 3

47 parts of 2-acetylamino-4-chloro-5-nitrophenol, 26 parts of 30% sodium hydroxide solution, 30 parts of water and 47.5 parts of para-toluenesulphonic acid-β-chloroethylester are stirred for 3 hours under reflux, the mixture is cooled, diluted with 500 parts of water, the water-insoluble reaction product is isolated by filtration and washed with water. 29.3 parts of the 2-acetylamino-4-chloro-5-nitrophenol-β-chloroethyl ether so obtained, 24 parts of piperidine and 0.5 part of sodium iodide are stirred for 24 hours at 100° C. The batch is diluted with 500 parts of water, rendered acidic to Congo paper by the addition of 25 parts of concentrated hydrochloric acid, and a small amount of insoluble resin is removed by filtration. A further 30 parts of concentrated hydrochloric acid are added, the batch is stirred for 2 hours at 90 to 95° C. and then allowed to cool. The aqueous hydrochloric acid solution may be used as it is for the manufacture of dyestuffs; but, the diazo component may also be precipitated from the aqueous solution in solid form by salting out or neutralization. The piperidine may also be replaced by other secondary amines, for example, morpholine, diethylamine or N-methylcyclohexylamine.

EXAMPLE 4

140 parts of an aqueous hydrochloric acid solution containing 29.6 parts of 2-(2'-amino-5'-nitro)-phenoxyethylpyridinium chloride obtained as described in Example 1 are diluted with 140 parts of glacial acetic acid, cooled to 0° C. and then diazotized by the addition of 25 parts of a 4 N aqueous sodium nitrite solution. Any small excess of nitrite which may be present is destroyed with sulphamic acid, the solution is mixed with a solution of 21.3 parts of N,N-bis-(2'-cyanoethyl)-3-methylaniline in 200 parts of glacial acetic acid, the mixture is stirred for about one hour, diluted with 1,000 parts of water, and the coupling mixture is then rendered neutral to Congo paper by the addition of 75 parts of sodium acetate crystals. The dyestuff is recovered from the deep red solution by salting out the sodium chloride. It dyes polyacrylonitrile fibres clear red shades possessing excellent fastness to light.

Further fast dyestuffs which dye polyacrylonitrile fibres the shades listed in column 3 of the following table may be obtained by using the coupling components listed in column 2 instead of N,N-bis-(2'-cyanoethyl)-3-methylaniline:

| Number | Coupling component | Shade |
| --- | --- | --- |
| 1 | 3-methylpyrazolone-(5) | Yellow. |
| 2 | 1-phenyl-3-methylpyrazolone-(5) | Do. |
| 3 | N,N-bis-(2'-cyanoethyl)-1-aminobenzene | Orange. |
| 4 | 2-methylindole | Do. |
| 5 | 1,2-dimethylindole | Do. |
| 6 | N-methyl-N-(2'-cyanoethyl)-1-aminobenzene | Red. |
| 7 | Diphenylamine | Red. |
| 8 | N,N-dimethylaniline | Claret. |
| 9 | 2-aminonaphthalene | Do. |

EXAMPLE 5

30 parts of the 2 - amino - 4 - chloro-5-nitrophenol-β-piperidinoethyl ether obtained in the manner described in Example 3 are dissolved in a mixture of 30 parts of concentrated hydrochloric acid and 400 parts of iced water and diazotized at 0° C. by the addition of 25 parts of a 4 N aqueous sodium nitrite solution. The diazo solution is run into a solution of 10 parts of 3-methylpyrazolone-(5), 10.6 parts of anhydrous sodium carbonate and 45 parts of crystallized sodium acetate in 500 parts of water. The dyestuff which precipitates completely after coupling is isolated by suction filtration and washed with water. It is dried, and a yellow dyestuff powder is obtained which dyes polyacrylonitrile fibres fast yellow shades when applied in an aqueous acetic acid bath.

The following table lists further dyestuffs obtained by coupling in the manner described in Examples 4 and 5, the diazo components of which are described in Examples 1 to 3.

| | Structural formula | Shade on polyacrylonitrile fabric |
|---|---|---|
| 1 | $O_2N-\underset{OCH_2CH_2-\underset{\underset{CH_3}{|}}{\overset{CH_3}{N}}-CH_3\ \ Cl}{\bigcirc}-N=N-\bigcirc-N\underset{CH_3}{\overset{CH_2CH_2CN}{}}$ | Red. |
| 2 | $O_2N-\underset{OCH_2CH_2-\underset{\underset{CH_3}{|}}{\overset{CH_3}{N}}-NH_2\ \ Cl}{\bigcirc}-N=N-\underset{CH_3}{\bigcirc}-N\underset{CH_2CH_2CN}{\overset{CH_2CH_2CN}{}}$ | Red. |
| 3 | $H_2NO_2Z-\underset{OCH_2CH_2-N\bigcirc\ Cl}{\bigcirc}-N=N-C\underset{H_3C-C\underset{H}{\overset{N}{\diagdown}}}{\diagup}$ (fused ring) | Reddish yellow. |
| 4 | $CH_3NHO_2Z-\underset{Cl}{\overset{OCH_2CH_2-\underset{C_2H_5}{\overset{Br\ C_2H_5}{N}}-C_2H_5}{\bigcirc}}-N=N-C\underset{HO-C\underset{H}{\overset{N}{\diagdown}}}{\diagup}C-CH_3$ | Yellow. |
| 5 | $CH_3O_2S-\underset{OCH_2CH_2-N\overset{CH_2-CH_2}{\underset{CH_2-CH_2}{\diagdown}}}{\bigcirc}-N=N-\bigcirc-N\underset{CH_3}{\overset{CH_3}{}}$ | Red |
| 6 | $O_2N-\underset{SCH_2CH_2-N\bigcirc\ Cl}{\bigcirc}-N=N-\underset{CH_3}{\bigcirc}-N\underset{CH_2CH_2CN}{\overset{CH_2CH_2CN}{}}$ | Red. |
| 7 | $O_2N-\underset{OCH_2CH_2-\underset{\underset{CH_3}{|}}{\overset{CH_3}{N}}-NH_2\ \ Cl}{\bigcirc}-N=N-\bigcirc-N\underset{CH_2CH_2Cl}{\overset{CH_2CH_2Cl}{}}$ | Red. |
| 8 | $O_2N-\underset{OCH_2CH_2-N\overset{Cl\ CH_2-CH_2}{\underset{CH_3}{\diagdown\ CH_2-CH_2}}}{\bigcirc}-N=N-\underset{CH_3}{\bigcirc}\overset{OCH_3}{\underset{}{-NH_2}}$ | Red. |

TABLE—Continued

| | Structural formula | Shade on polyacrylonitrile fabric |
|---|---|---|
| 9 | (structure) | Yellow. |
| 10 | (structure) | Red. |
| 11 | (structure) | Orange. |
| 12 | (structure) | Red. |
| 13 | (structure) | Claret. |
| 14 | (structure) | Yellow. |
| 15 | (structure) | Red. |
| 16 | (structure) | Red. |

TABLE—Continued

| | Structural formula | Shade on polyacrylonitrile fabric |
|---|---|---|
| 17 | | Red. |
| 18 | | Red. |
| 19 | | Orange. |
| 20 | | Do. |
| 21 | | Do. |
| 22 | | Red. |
| 23 | | Red. |
| 24 | | Bluish red. |
| 25 | | Red. |

| | Structural formula | Shade on polyacrylonitrile fabric |
|---|---|---|
| 26 | | Yellowish red. |
| 27 | | Bluish red. |
| 28 | | Yellow. |
| 29 | | Do. |
| 30 | | Do. |
| 31 | | Do. |
| 32 | | Do. |

TABLE—Continued

| | Structural formula | Shade on polyacrylonitrile fabric |
|---|---|---|
| 33 | (chemical structure) | Yellow. |
| 34 | (chemical structure) | Do. |
| 35 | (chemical structure) | Do. |
| 36 | (chemical structure) | Do. |
| 37 | (chemical structure) | Red. |
| 38 | (chemical structure) | Yellow. |
| 39 | (chemical structure) | Do. |

3,661,886

21 TABLE—Continued 22

| Structural formula | Shade on polyacrylonitrile fabric |
|---|---|
| 40. (structure) | Yellow. |
| 41. (structure) | Do. |
| 42. (structure) | Bluish red. |
| 43. (structure) | Yellow. |
| 44. (structure) | Yellowish red. |
| 45. (structure) | Red. |

EXAMPLE 6

35.5 parts of the monoazo dyestuff of the formula

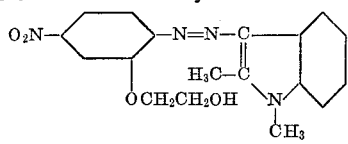

are dissolved in 300 parts of pyridine and then 22 parts of powdered para-toluenesulphochloride are added at 10 to 15° C. The batch is stirred for 6 hours at 10 to 15° C., the esterified dyestuff is precipitated by dilution with 1,500 parts of water, isolated by filtration and dried. 10.2 parts of the esterified dyestuff, 100 parts of ethyl alcohol and 3.6 parts of N,N-dimethylhydrazine are boiled for 4 hours under reflux until a test sample does not become turbid when diluted with water. The batch is evaporated to dryness in vacuo, the residue is dissolved in 500 parts of 2% acetic acid, and the dyestuff is precipitated from the aqueous solution by the addition of 20 parts of sodium bromide. It dyes polyacrylonitrile fibres orange shades possessing very good light fastness.

Similar orange dyestuffs may be obtained by using pyridine; trimethylamine; piperidine or N-methylmorpholine instead of N,N-dimethylhydrazine.

EXAMPLE 7

12.3 parts of the dyestuff of the formula

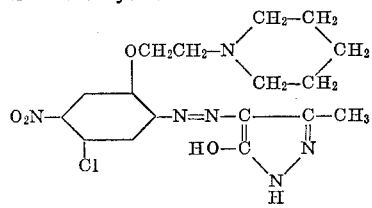

obtained in the manner described in Example 5 are dissolved in 100 parts of dimethylformamide at 80° C. 4 parts of dimethyl sulphate are added to the solution dropwise and the batch is stirred for 8 hours at 80 to 90° C. The warm reaction mixture is diluted with 1,600 parts of water and a small proportion of non-quaternated dyestuff is removed by filtration. The quaternated dyestuff is precipitated from the filtrate by the addition of 30 parts of sodium iodide. It dyes polyacrylonitrile fibres bright yellow shades possessing good properties of fastness.

Dyeing procedure 1 part of the dyestuff obtained in the manner described in the first paragraph of Example 4 is dissolved in 5,000 parts of water in the presence of 2 parts of 40% acetic acid. 100 parts of dried polyacrylonitrile staple fibre yarn are entered into this dyebath at 60° C., the temperature is raised to 100° C. within half an hour and dyeing is carried out for one hour at the boil. The yarn is then well rinsed and dried.

What I claim is:

1. A basic dyestuff which is free from acidic groups imparting solubility in water and which corresponds to the formula

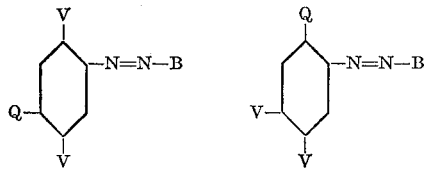

in which Q represents nitro, cyano,

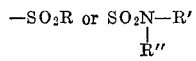

wherein R is lower alkyl, cyclolower alkyl, benzyl, phenyl or phenyl subsituted by lower alkyl, chlorine or bromine, R' is hydrogen or lower alkyl and R'' is hydrogen, lower alkyl, cyclo lower alkyl, benzyl, phenyl or phenyl substituted by lower alkyl, chlorine or bromine and one of the symbols V is hydrogen, lower alkyl, chlorine or bromine and the other V is a group of the formula

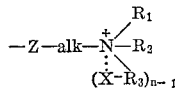

wherein Z is oxygen or sulfur, alk is ethylene, propylene, isopropylene, hydroxypropylene or butylene, $X^-$ is an anion, $R_3$ is lower alkyl, cyclolower alkyl, benzyl or amino, N, $R_1$ and $R_2$ together form a piperidine, morpholine or pyrrolidine ring and N, $R_1$, $R_2$ and $R_3$ together form a pyridine ring, and in which dyestuffs B is a coupling component of the benzene or naphthalene series and wherein "lower" means containing at most 7 carbon atoms, X is an anion, $n$ stands for 1 or 2, and V is the only such group in the dyestuff molecule.

2. A basic dyestuff as claimed in claim 1, wherein in the given formulae B is the radical of an N-loweralkylated, N-benzylated and N-phenylated aminobenzene bound to the azo-group in para-position to the amino group, a 2-aminonaphthalene bound to the azo-group in 1-position, and wherein "lower" means containing at most 7 carbon atoms.

3. A basic dyestuff as claimed in claim 1, wherein in the given formulae B is the radical of an aminobenzene which contains a member selected from the group consisting of a lower alkyl and a lower cyanoalkyl group attached to the amino group and which may be substituted in the nucleus by a member selected from the group consisting of chlorine, bromine, lower alkyl, lower alkoxy and acylamino, and wherein "lower" means containing at most 7 carbon atoms and "acyl" means the radical of a carboxylic acid containing at most 8 carbon atoms.

4. A basic azo dyestuff as claimed in claim 1, wherein Z is oxygen, Q is nitro and X is an anion of a strong inorganic acid, a sulfonic acid semi ester, a carboxylic acid or a sulfonic acid.

5. The basic azo dyestuff as claimed in claim 1 and corresponding to the formula

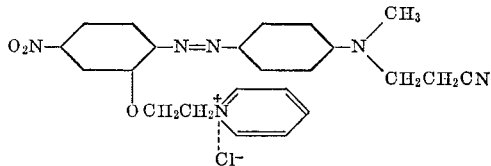

6. The basic azo dyestuff as claimed in claim 1 and corresponding to the formula

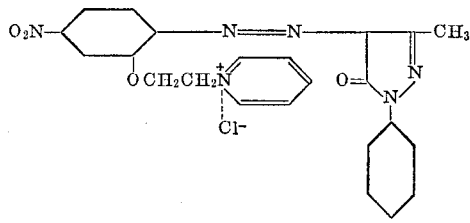

7. The basic azo dyestuff as claimed in claim 1 and corresponding to the formula

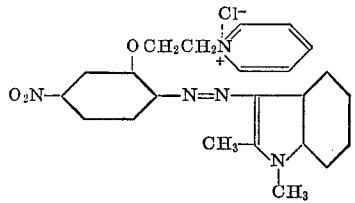

8. The basic azo dyestuff as claimed in claim 1 and corresponding to the formula

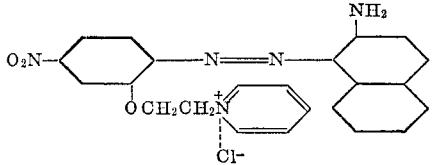

9. The basic azo dyestuff as claimed in claim 1 and corresponding to the formula

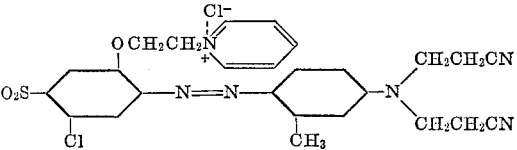

References Cited

UNITED STATES PATENTS 2,140,944　12/1938　Schirm _____ 260—156
3,170,910　2/1965　Neracher et al. _____ 260—156 X
3,272,793　9/1966　Taber et al. _____ 260—156

FLOYD D. HIGEL, Primary Examiner

U.S. Cl. X.R.

260—152, 154, 155, 162, 163, 165, 205, 206, 207, 296 AE, 465 E, 490